United States Patent
Hendrickson

[15] 3,701,394
[45] Oct. 31, 1972

[54] DRIVE MEANS FOR SNOWMOBILE DEVICES

[72] Inventor: George Vernon Hendrickson, Twin Valley, Minn.

[73] Assignee: Viking Snowmobiles, Inc., Twin Valley, Minn.

[22] Filed: July 23, 1971

[21] Appl. No.: 165,451

[52] U.S. Cl.....................180/5 R, 305/27, 180/9.54
[51] Int. Cl........................B62m 27/02, B62d 55/10
[58] Field of Search.................180/5 R, 9.54; 305/27

[56] References Cited

UNITED STATES PATENTS

| | | | |
|---|---|---|---|
| 1,276,035 | 8/1918 | Crane | 180/5 R |
| 1,336,832 | 4/1920 | Fuchs | 305/27 |
| 3,485,312 | 12/1969 | Swenson | 180/5 R |
| 3,613,811 | 10/1971 | Brandli | 180/5 R |
| 3,613,810 | 10/1971 | Hetteen | 180/5 R |

Primary Examiner—Richard J. Johnson
Attorney—Orrin M. Haugen

[57] ABSTRACT

A drive and suspension assembly for snowmobiles or similar vehicles having endless track propulsion means, wherein the angular disposition of the base of the track is responsive to increases in torque being applied to the drive sprockets. The snowmobile vehicles are provided with conventional frames with forward and rear mounts for attaching the drive and suspension assembly to the frame, and means are provided on the drive and suspension assembly for receiving a drive track. Forward drive sprocket means are provided for delivering power to the track and rear idler sprockets are provided to support the track and define upper and lower spans in the track. The drive and suspension assembly comprises an elongated generally longitudinally disposed suspension support means having a forward end portion journaled to the forward frame mount and being adapted for pivotal motion thereabout. A rearwardly disposed mounting means is provided including a generally transversely disposed mounting shaft having stabilizing means resiliently coupling the rear mounting shaft to the rear frame mount, with the stabilizer means normally urging the suspension support means away from the rear frame mount. The stabilizer means normally include shock absorbers and coil springs. The suspension support means further has a rear pivotal coupling means disposed adjacent the rear portion thereof, the rear pivotal coupling means being attached to longitudinally arranged support rails for the lower span of the drive track. The longitudinal support rails are journaled with the rear pivotal coupling means of the suspension support, with lug means being provided extending upwardly from the support rail means for mounting the rear axle shaft for the rear idler sprockets. The longitudinal support rail means further are provided with track contacting means which support the inner surface of the lower span of the drive track to define a running surface for the lower span.

14 Claims, 10 Drawing Figures

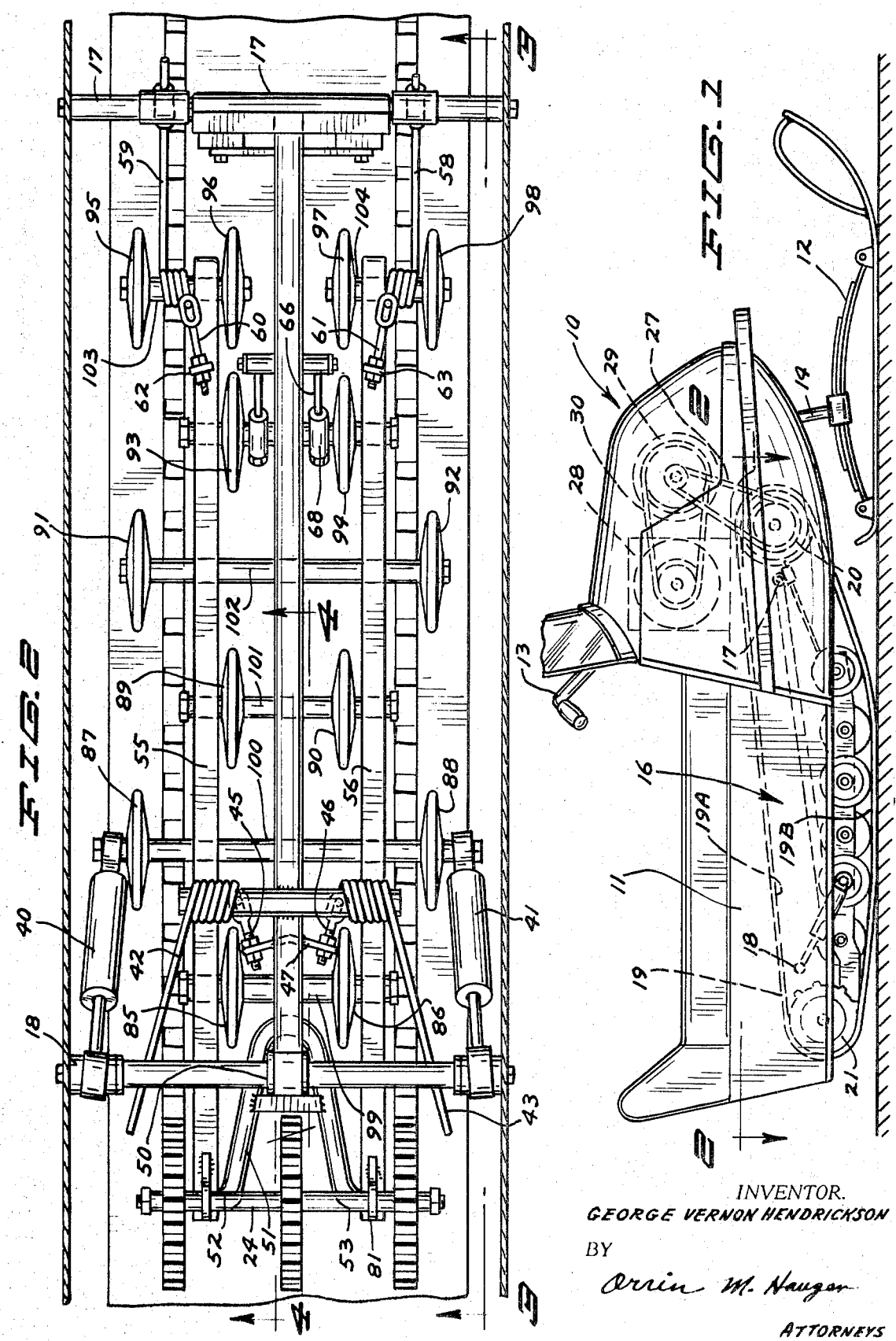

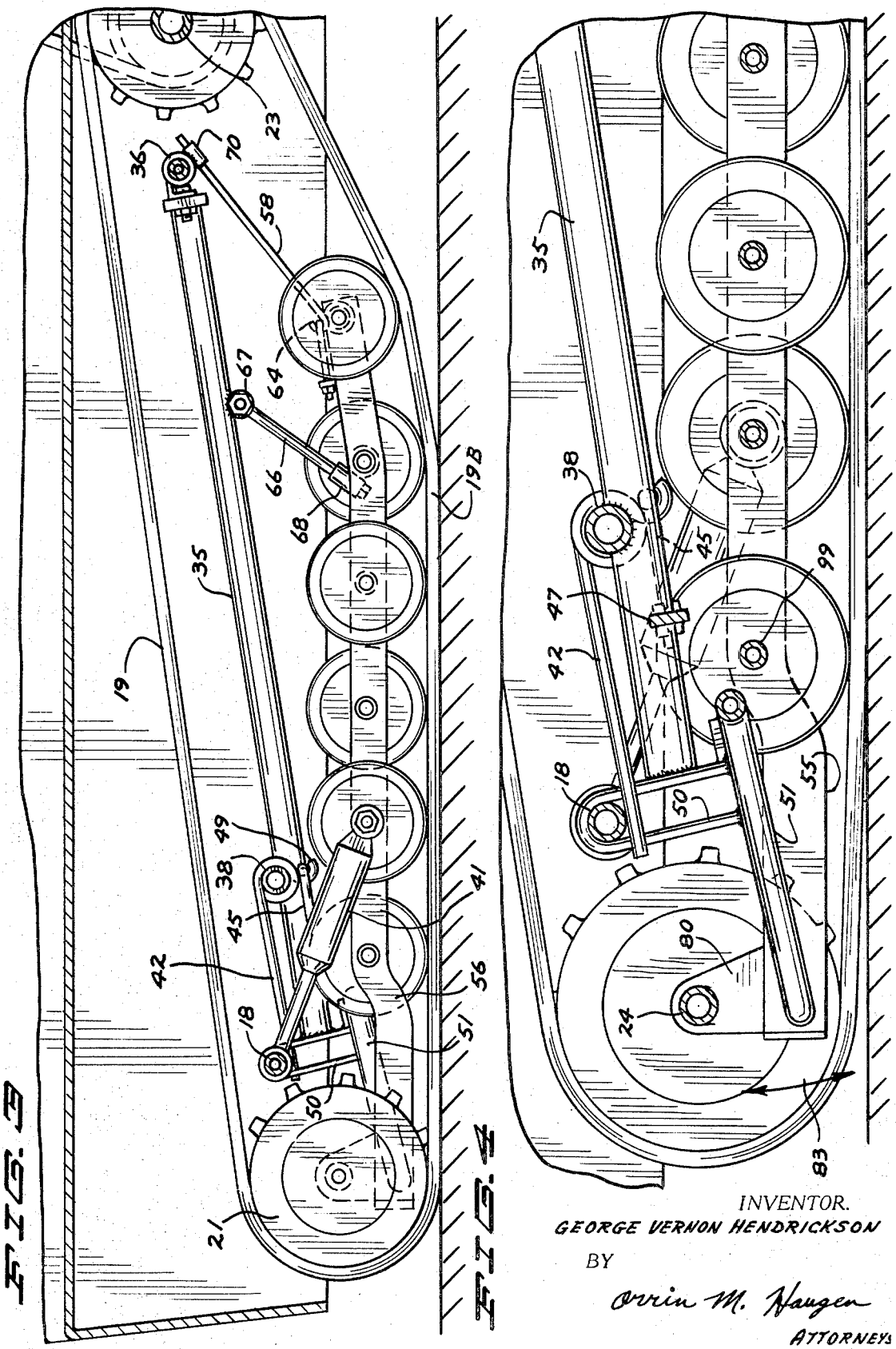

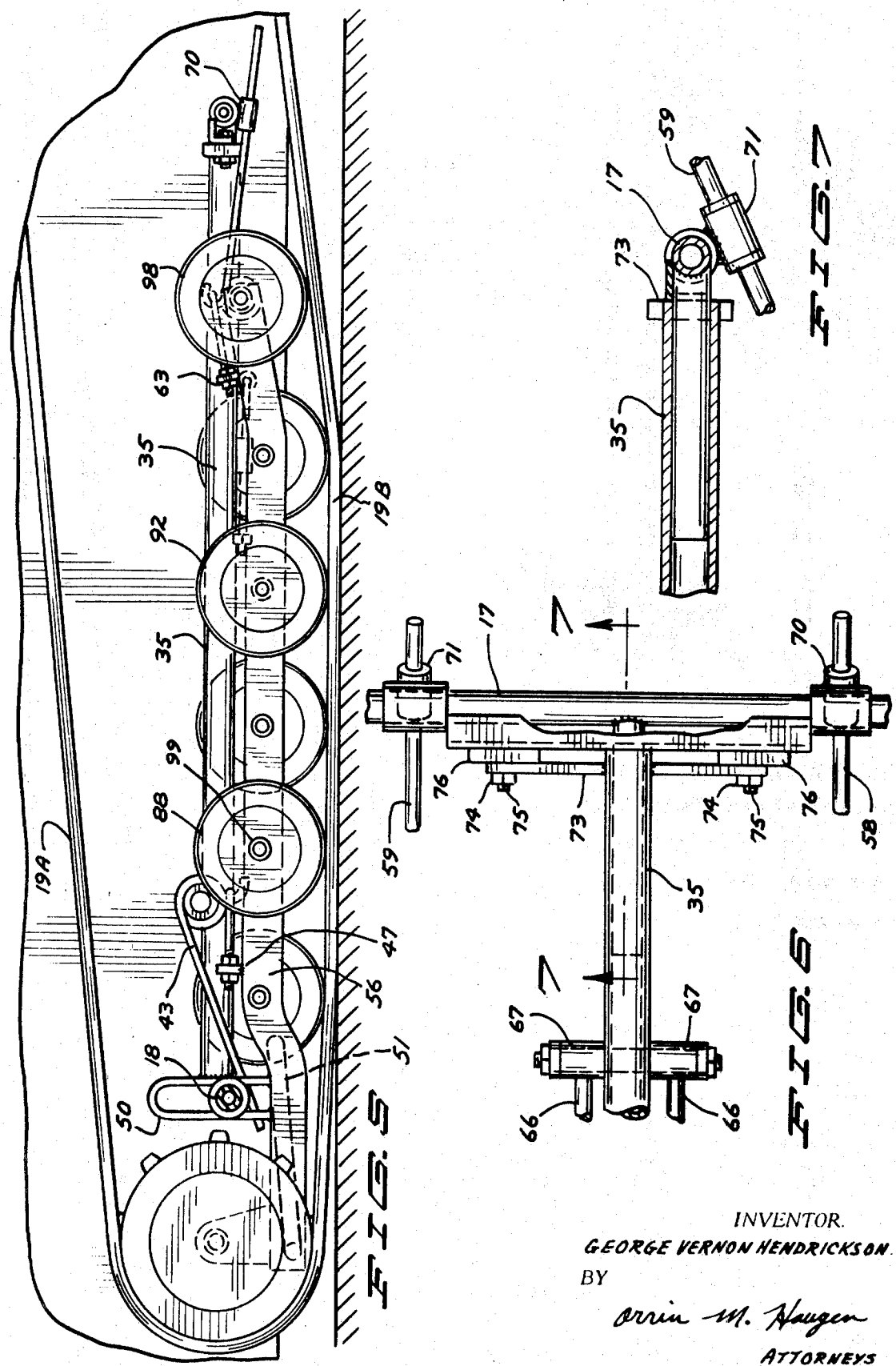

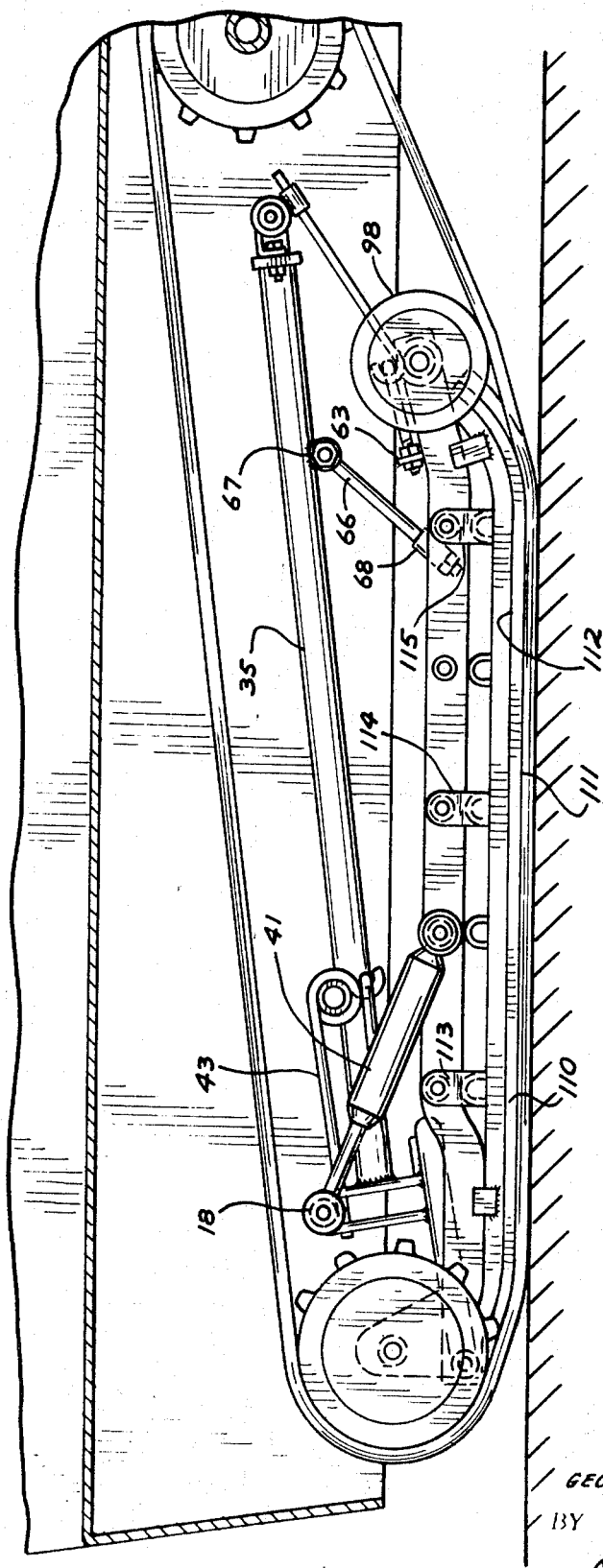

DRIVE MEANS FOR SNOWMOBILE DEVICES

BACKGROUND OF THE INVENTION

The present invention relates generally to a drive and suspension assembly for vehicles having endless track propulsion means, or segments coupled together to form an endless track, and more specifically to a drive and suspension assembly for a self-propelled snowmobile structure. The drive and suspension assembly of the present invention provides a drive surface angle of attack which is responsive to the torque being applied to the endless track. As the torque increases, the forward portion of the drive and suspension assembly moves downwardly away from the vehicle in response to the increase in torque such as, for example, during acceleration or climbing. The function is reversed upon deceleration. Furthermore, the drive and suspension assembly is capable of providing a smooth ride under a variety of operating conditions, with the track surface being arranged to contact the running surface at all times. The structure is further designed to provide constant tension particularly along the bottom span in the track at all times, regardless of the disposition of the track within the suspension assembly.

The drive and suspension assembly of the present invention enables the structure to move effectively without excessive slipping or skidding under difficult driving conditions, such as, for example, during racing events and the like. The improved drive and suspension assembly of the present invention provides for optimum contact between the drive surface of the endless track and the running surface. Means are also provided for adjusting the spring force utilized in the suspension, so as to provide a smooth ride under a variety of conditions. All of these advantages are achieved with the use of an extremely rugged and durable structure.

SUMMARY OF THE INVENTION

Therefore, it is primary object of the present invention to provide an improved drive and suspension assembly for snowmobile structures having endless track propulsion means, wherein the angular disposition of the running surface of the track is responsive to the torque being applied to the track.

It is a further object of the present invention to provide an improved drive and suspension assembly for snowmobile vehicles having endless track propulsion means wherein the suspension means is provided with a pair of longitudinal support rails which define the running surface for the lower span of the endless track, these support rails being pivotal in response to the torque being applied to the drive track.

It is yet a further object of the present invention to provide an improved drive and suspension assembly for vehicles having endless track propulsion means wherein longitudinally disposed support rails are provided for the lower span of the endless track, and wherein the support rails provide a base running surface for the track responsive to the drive torque being applied to the endless track, and wherein the drive and suspension means is adapted to provide a smooth ride generally free from shock experienced over uneven terrain.

It is yet a further object of the present invention to provide an improved drive and suspension assembly for vehicles having endless track propulsion means wherein improved means for supporting the lower surface of the endless track are provided, and wherein controlled resilient bias is available between the frame of the vehicle structure and the drive and suspension assembly.

Other and further objects of the present invention will become apparent to those skilled in the art upon a study of the following specification, appended claims, and accompanying drawings.

BRIEF DESCRIPTION OF THE DRAWINGS

FIG. 1 is a side elevational view of a snowmobile vehicle utilizing the improved drive and suspension assembly of the present invention, with the drive and suspension assembly being shown partially in phantom;

FIG. 2 is a detail horizontal sectional view on a slightly enlarged scale, and being taken along the line and in the direction of arrows 2—2 of FIG. 1, with the upper span of the endless track being cut away;

FIG. 3 is a vertical sectional view taken along the line and in the direction of the arrows 3—3 of FIG. 2;

FIG. 4 is a detail sectional view on a slightly enlarged scale, and taken along the line and in the direction of the arrows 4—4 of FIG. 2;

FIG. 5 is a view similar to FIG. 4, but on a slightly reduced scale, and illustrating the drive and suspension assembly in collapsed disposition;

FIG. 6 is a detail plan view of the forward portion of the drive and suspension assembly, and illustrating the manner of coupling this portion of the assembly to the frame mount;

FIG. 7 is a detail vertical sectional view taken along the line and in the direction of the arrows 7—7 of FIG. 6;

FIG. 8 is a vertical sectional view similar to FIG. 3, and illustrating a modified configuration of the drive and suspension assembly of the present invention utilizing a slide rail structure in lieu of the bogie wheel structure illustrated in FIGS. 1–7;

DESCRIPTION OF THE PREFERRED EMBODIMENT

Figure 9:
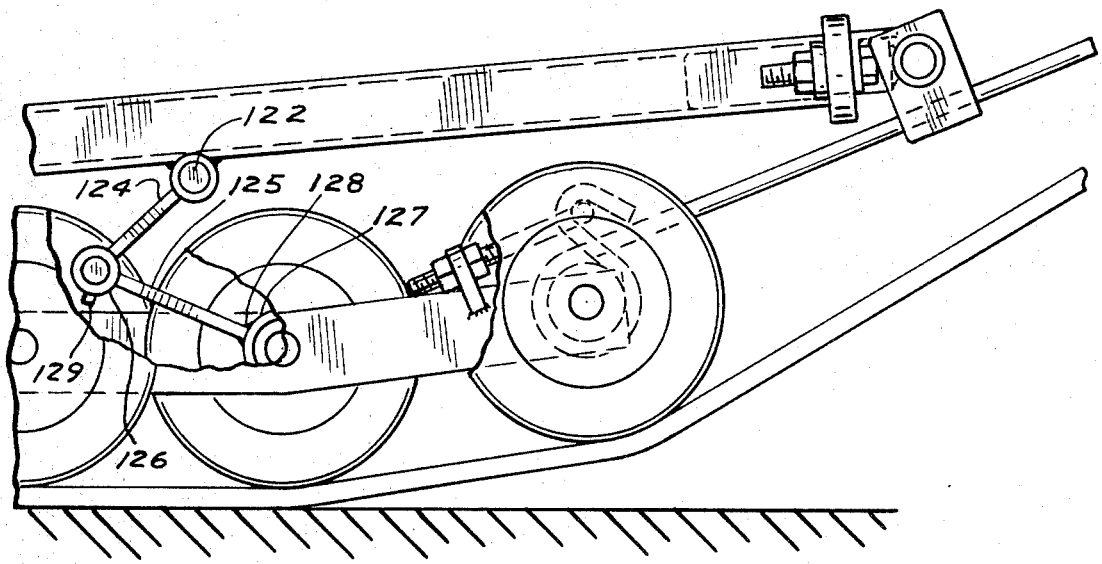
FIG. 9 is a detail fragmentary elevational view of a portion of a modified form of stabilizer structure used in coupling the support rails to the main longitudinal shaft of the assembly.

With particular attention being directed to FIG. 1 of the drawings, the self-propelled snowmobile vehicle generally designated 10 includes a frame structure and housing 11 supported upon a forward ski structure 12 which is steerable through the steering column assembly 13 and coupled to the frame 11 through the ski mounting arrangement 14. The steering portion of the snowmobile structure is conventional, and snowmobile vehicles having this arrangement of components are, of course, available commercially. The drive and suspension assembly shown generally at 16 is coupled to the frame 11 at the forward mount 17, and the rear mount 18. The drive track is shown at 19, and is supported by a forward drive sprockets 20—20 and rear idler sprockets 21—21. As is indicated, the forward drive sprockets 20—20 are journaled on front axle shaft 23, while rear idler sprockets 21—21 are supported on rear axle shaft 24. As is illustrated in FIGS. 1 and 3, drive belt 27 is utilized to provide the driving torque from the engine 28 through transmission assembly 29. Also, as is conventional, main drive belt 30 is utilized to deliver power from engine 28 to transmission 29.

Endless drive track 19, in the operational configuration, has an upper span segment 19A, and a lower ground or surface contacting segment 19B. As has been indicated hereinbefore, the drive and suspension assembly of the present invention provides a means for controlably modifying the angle or running disposition of the lower span 19B of track 19 in response to the torque being delivered to belt 19 at the forward drive sprockets. As this torque increases, that portion of the drive and suspension assembly in contact with the lower span portion 19B of belt 19 moves downwardly against the running surface, so as to provide improved traction under conditions of acceleration and climb. This shifting of the angle or running disposition of the lower span of track 19 is accomplished without modifying the tension in the track. It will also be observed, particularly in FIGS. 1, 4 and 5 that the rear idler sprockets are normally elevated from the running surface. This enhances the ability of the structure to turn about a shorter radius, and tends to eliminate fishtailing during operation.

Attention is now directed to FIGS. 2 and 3 of the drawings wherein certain of the details of the drive and suspension assembly are illustrated with clarity. The structure includes an elongated generally longitudinally disposed suspension support means 35 which is in the form of a shaft or the like, and which is centrally disposed. The forward end portion of support means 35 is journaled to the forward frame mount 17, such as in the bushing arrangement shown at 36. This arrangement provides for pivotal motion of support shaft 35 about mount 17. Support shaft 35 is coupled to transverse mounting shaft 38, mounting shaft 38 being provided with stabilizer means in the form of laterally arranged shock absorbers 40 and 41, along with resilient spring members 42 and 43. These stabilizing means in the form of shock absorbers 40 and 41, and resilient spring members 42 and 43, are coupled to rear frame mount 18, as is indicated in FIG. 2, with one end bracket of each of shock absorbers 40 and 41 being coupled directly to frame mount 18, and with the free ends of coil spring members 42 and 43 being urged against the underside portion of frame mount 18. Tension in springs 42 and 43 is adjustably controlled by means of clamping buckles 45 and 46, with one end portion of buckles 45 and 46 being secured to mounting ears 47—47, and with the hook end portion of buckles 45 and 46 engaging the claw portion of the spring, such as is shown at 49 in FIG. 3.

The rear portion of suspension support shaft 35 is provided with an inverted generally U-shaped slide member 50, which circumscribes the outer circumference of the shaft forming the frame mount 18, with the individual legs of member 50 being secured to rear yoke member 51, as is indicated in detail in FIG. 4. It will be appreciated that yoke 51 forms a portion of the longitudinally disposed suspension support means, as does U-shaped member 50. The rearwardmost free ends of yoke 51, such as are shown at 52 and 53, engage the rear leg portions of support rails 55 and 56, in the manner illustrated in FIGS. 2 and 4. As is indicated, a pivotal engagement is used to couple member 51 to each of the rails 55 and 56 in order to permit relative pivotal rotation between these portions of the apparatus. A portion of the detail is illustrated in FIG. 3 as well.

Further details of the longitudinally disposed suspension support means are illustrated in FIGS. 6 and 7. As is indicated in these figures, forward spring bias member 58 is utilized to normally bias support rails 55 and 56 downwardly and away from the longitudinally disposed suspension support means 35. As is apparent in FIGS. 2 and 3, two such spring members are provided, these being shown at 58 and 59. Buckle members 60 and 61 are utilized to control the tension in spring members 58 and 59, with buckles 60 and 61 being adjustable in their disposition through brackets 62 and 63. As is indicated in FIG. 3, a claw portion of spring 58, such as is illustrated at 64, engages the eye portion of buckle 61.

In order to controllably guide the motion of support rails 55 and 56 relative to the suspension support means 35, a pair of rod and sleeve assemblies are provided as at 66, these assemblies having a pivotal mounting point at or along shaft 35, and a sleeve member as at 68. Thus, lateral displacements of rails 55 and 56 from support means 35 will be avoided. A modified form of controlable guide is illustrated in FIG. 9.

In order to accommodate the relative motion between support rails 55 and 56, and suspension support means 35, sleeve guides are also provided for springs 58 and 59, as shown at 70 and 71. Such an arrangement enhances the ability of the unit to respond to the torque being applied to the drive track, and also to respond to changes in terrain. The adjustable tension feature is utilized to match the stiffness of the springs 58 and 59 to the load being carried.

With continued attention being directed to FIGS. 6 and 7 of the drawings, the adjustment for longitudinal length of the drive and suspension assembly is illustrated. This adjustment feature permits accommodation for variations in track length which may be encountered in snowmobile structures. A locking collar is shown at 73, collar 73 being secured by bolts 74—74 to studs 75—75. Shims are provided as at 76 to accommodate the length requirements of the longitudinally disposed suspension support means 35. Shims 76 are preferably large rubber grommets, and in addition to controlling the axial length of the system, also permit a certain amount of lateral flexing to occur in the structure. This lateral flexing enhances the ability of the unit to respond smoothly to uneven surface terrain and to avoid pulling to one side or the other in response to uneven terrain.

Also, in order to control the length of the drive suspension, the bores formed in the walls of the tunnel in order to accommodate the mounting points 17 and 18, may be in the form of elongated slots. Such slots will permit additional adjustment of the axial length of the suspension system. In order to secure such a system in place, conventional jam nuts may be employed to achieve the adjustment feature.

Attention is now re-directed to FIGS. 3 and 4 of the drawings wherein the details of longitudinal support rail means are best illustrated. In this connection, the individual rails 55 and 56 are provided with lug means 80 which extend upwardly from the rear pivotal coupling with segments 52 and 53 of yoke member 51. As is indicated in FIG. 2, for example, support rail 56 is provided with its lug member 81. At the upper end of each of lug members 80 and 81 there is provided means for mounting the rear axle shaft 24, rear axle shaft 24 being provided to journal and otherwise accommodate rotation of rear idler sprockets 21—21. This feature is, of course, illustrated in FIGS. 3 and 4, with additional detail being supplied from FIG. 2. With the offset provided between the pivotal mounting of segments 52 and 53 to the support rails 55 and 56 and the axle shaft 24, pivotal rotation is accordingly provided across the moment arm existing between the suspension support means and the rear axle shaft 24. This moment arm provides for pivotal rotational motion between the longitudinally disposed suspension support means and the support rails 55 and 56 in accordance with the arcuate arrow shown at 83.

As is apparent from the illustrations in FIG. 3 and 4, the vertical disposition of the axle shaft 24 is actually ahead or forwardly of the axis of portions 52 and 53 of yoke 51. Preferably, this leading disposition should be in the area of about 6° of arc, so as to eliminate the tendency for the pivotal motion to arrive at a "top-dead-center" disposition. Thus, the motion will be smooth and uniform between the suspension support means and the support rail means.

By way of functional response, as increased torque is being delivered to the front drive sprockets 20—20, tension in the upper span 19A of belts 19 increases, thus delivering a forwardly directed force to axle shaft 24. This forwardly directed force, in turn, finds response and reaction by a downward thrust on each of support rails 55 and 56. This downwardly directed thrust is in the clockwise direction of double-ended arrow 83, and results in an increase in traction between the running surface and the lower surface 19B of belt 19. This motion is accomplished without modifying or changing tension in the track. Thus, as the rear idlers move forward, the motion in the support rails takes up any slack that may develop due to forward rocking of rear idlers 21—21. Each of support rails 55 and 56 are provided with track contacting means which support the inner surface of the lower span 19B of belt 19, these supporting members being in the form of longitudinally spaced bogie wheels 85–98 inclusive. While wheels 85–98 have been referred to as "bogie wheels," it will be appreciated that these wheels are in effect idler wheels which maintain a force against the inner surface of the belt so as to cause the belt to conform to the profile desired. If desired, the wheels 85–98 may be spring-loaded so as to exert a resilient force against the inner surface of the belt structure. Therefore, for purposes of this application, the term "bogie wheels" is used in a comprehensive sense and includes both resiliently biased idler wheels as well as fixed idler wheels. As is apparent from the illustrations in FIG. 2, wheels 85 and 86 are journaled on transverse shaft 99, while wheels 87 and 88 are independently journaled on shaft 100. Additional transverse bogie wheel shafts are shown at 101 and 102, with independent shafts being provided for bogie wheels 95 and 96 at 103, and for bogie wheels 97 and 98 as at 104. It will be appreciated that the alternate structure illustrated in FIG. 8 substitutes slide rails for the bogie wheels, with this structure being discussed in detail hereinafter.

Suitable means of securing the individual bogie wheel shafts to the support rails 55 and 56 may be utilized, such as, for example, welding, clamping, bolting, or the like.

With attention being directed to FIG. 5, the disposition of the drive and suspension assembly is shown there in collapsed form. This disposition would be expected to occur upon operation over rough terrain, when a downward thrust is applied to the drive and suspension assembly from the frame of the vehicle. The system is capable of accommodating such motion without difficulty, and hence it will be appreciated that a relatively smooth ride can be obtained from the structure when utilizing this drive and suspension assembly.

Attention is now directed to FIG. 8 of the drawings wherein a modified form of the structure is illustrated utilizing slide rails rather than bogie wheels. These slide rails are shown at 110, and have an under surface 111 which makes contact with the inner surface of the lower span 19B of belt 19, such as at 112. Suitable low friction surfacing is provided for slides 110, such as, for example, Teflon, nylon, or the like. Such coatings may be utilized to reduce the friction which may otherwise exist between the belt and the slides. The individual slides 110 are coupled to the support rails 55 and 56 by means of mounting lugs 113, 114 and 115. In the embodiment of FIG. 8, forwardly disposed bogies are normally utilized, such as are illustrated at 98, these bogies being the same as those utilized in the modification illustrated in FIgS. 1–7. The other features of the slide rail embodiment are the same as those previously discussed in connection with the bogie wheel structure, and the function of the structures are, accordingly, substantially identical. With the lower periphery of the rear idlers being elevated from the normal running surface, and with the arrangements as illustrated herein, it will be apparent that a constant pressure will exist along the surface of the track throughout the contacting surface. Such an arrangement equalizes the forces throughout the contacting extent of the track and hence enhances the smoothness of the ride, as well as the serviceability of the track.

Figure 10:
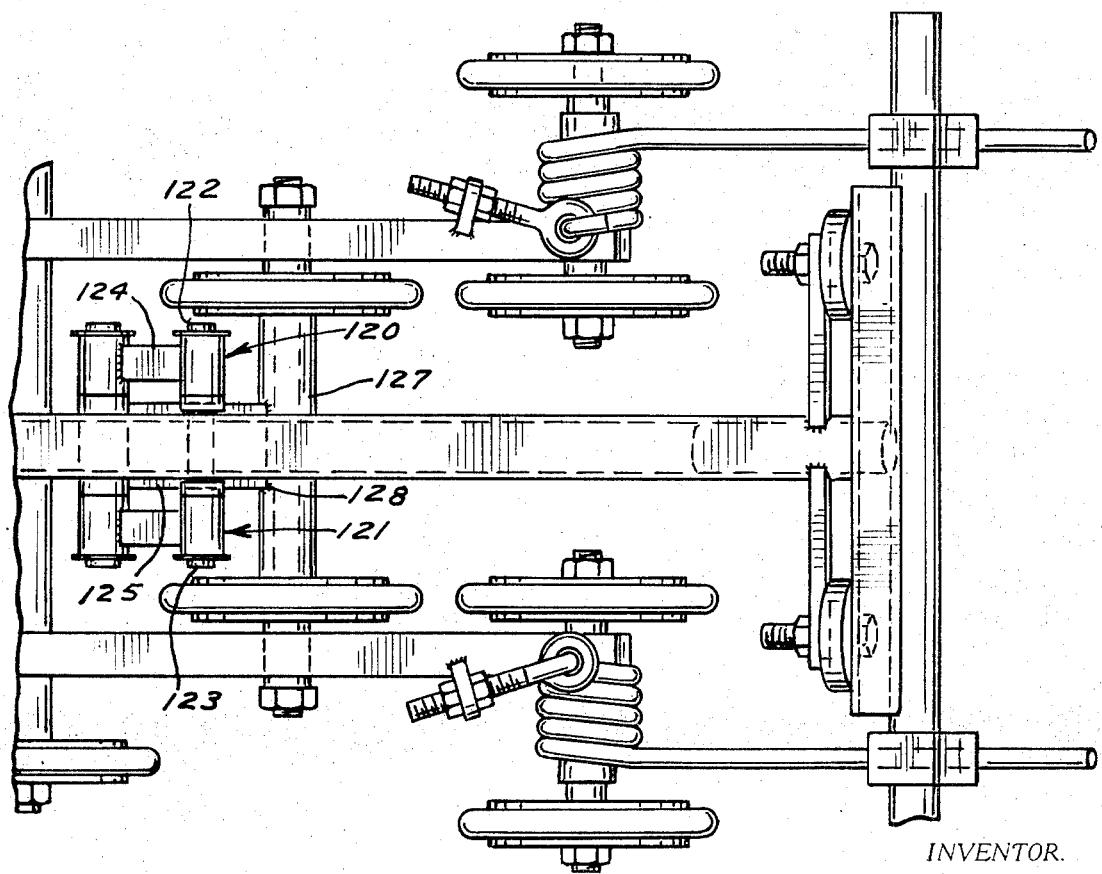
FIG. 10 is a detail fragmentary plan view of the structure of FIG. 9.

Attention is now directed to FIGS. 9 and 10 of the drawings wherein a modified form of controlable guide is illustrated, this feature controlling the motion of the support rails 55 and 56 relative to the suspension support means 35. In this connection, a pair of hinge support means generally designated 120 and 121 are provided, these hinge support means being secured to the member 35 by means of bushings, such as are illustrated at 122 and 123. These hinge support means 120 and 121 include a pair of arm elements 124 and 125 converging upon a common pivotal point 126 such as a pinned bushing, these arm elements being, in turn, coupled to the rail structure along bogie wheel axle housing 127 as at 128, axle 127 being secured to the support rails. Stop lug 129 prevents over-centering of the arm elements. While this latter portion of the hinge support means has been described with regard to a bogie wheel structure, it will be appreciated that the same structure applies to the slide rail structure shown in FIG. 8.

It will be appreciated that the structure of the present invention is particularly adapted for use with a snowmobile structure having a drive sprocket at the forward end of the endless drive track. The unit can be adapted for functioning with other drive systems, by a mere reversal of certain components. Such a modification will, of course, be readily apparent to those skilled in the art, and may be made without departing from the aspects of the structure illustrated herein.

I claim:

1. A drive and suspension assembly for vehicles having endless drive track propulsion means, the vehicle having a frame with forward and rear mounts for attaching the drive and suspension assembly to the frame, means for receiving a drive track on said drive and suspension assembly, and forward drive sprocket means for delivering power to said track, and rear idler sprocket means supporting said track and being journaled on rear axle shaft means, said sprockets defining an upper and lower span in said drive track, said drive and suspension assembly comprising:
   a. an elongated generally longitudinally disposed suspension support means having a forward end portion journaled to said forward frame mount and adapted for pivotal motion thereabout, and with a rearwardly disposed mounting means including a generally transversely disposed mounting shaft having stabilizing means resiliently coupling said rear mounting shaft to said rear frame mount with said stabilizer means normally urging said longitudinal suspension support means away from said rear frame mount, said suspension support means having a rear pivotal coupling means disposed adjacent the rear portion thereof;
   b. longitudinal support rail means for the lower span of said drive track journaled with said rear pivotal coupling means, said support rail means having lug means extending from said support rail means for mounting said rear axle shaft means thereto, the axis of said rear axle shaft being generally parallel to and spaced upwardly from said rear pivotal coupling means; and
   c. said longitudinal support rail means having track contacting means supporting the inner surface of the lower span of said endless drive track and defining a running surface for said lower span, said support rail means being adapted for arcuate pivotal rotation with said lug means about said rear pivotal coupling.

2. The drive and suspension assembly as defined in claim 1 being particularly characterized in that the axis of said rear axle shaft is disposed normally forwardly of the axis of said rear pivotal coupling means.

3. The drive and suspension assembly as defined in claim 1 being particularly characterized in that said stabilizer means includes a pair of elongated shock absorbers coupling said rear frame mount to said longitudinal support rails.

4. The drive and suspension assembly as defined in claim 1 being particularly characterized in that said longitudinal support rails include a pair of generally parallelly disposed rails disposed adjacent the lateral outer edges of said endless track.

5. The drive and suspension assembly as defined in claim 4 being particularly characterized in that a plurality of bogie wheels are secured to said longitudinal support rails at longitudinally spaced intervals therealong.

6. The drive and suspension assembly as defined in claim 4 being particularly characterized in that slide rail means are disposed along the lower surface of said support rails.

7. The drive and suspension assembly as defined in claim 1 being particularly characterized in that said resilient means coupling said rear mounting shaft to said rear frame mount includes a coil spring, and means are provided for adjusting a bias force normally urging said suspension support means away from said rear frame mount.

8. The drive and suspension assembly as defined in claim 1 being particularly characterized in that forward stabilizer means are provided for controlling the lateral disposition of said support rails relative to said longitudinally disposed suspension support means.

9. The drive and suspension assembly as defined in claim 1 being particularly characterized in that second resilient means are disposed adjacent the forward end of said support rail means for normally urging the forward end of said support rail means downwardly away from said forward frame mount.

10. The drive and suspension assembly as defined in claim 1 being particularly characterized in that adjustment means are provided for controlling the length of said longitudinally disposed suspension support means.

11. The drive and suspension assembly as defined in claim 1 being particularly characterized in that said suspension support means includes an axially disposed shaft extending a substantial portion of the distance between said forward and rear frame mounts.

12. The drive and suspension assembly as defined in claim 11 being particularly characterized in that said suspension support means includes a yoke member disposed at the rear portion thereof, with said yoke member coupling said suspension support means to said lug means.

13. The drive and suspension assembly as defined in claim 1 being particularly characterized in that the pivotal motion of said rear axle shaft and said support rails about said rear pivotal coupling is arranged to maintain substantially constant tension in said lower drive track span.

14. The drive and suspension assembly as defined in claim 1 being particularly characterized in that said elongated generally longitudinally disposed suspension support means is adapted for pivotal motion in two coordinates of planes, the first being about said forward frame mount, and the second being about the central axis of said longitudinally disposed suspension support means.

* * * * *